United States Patent
Morris et al.

(10) Patent No.: US 9,339,735 B2
(45) Date of Patent: May 17, 2016

(54) THREE DIMENSIONAL FOLDED FIGURES WITH ROTATING JOINTS

(71) Applicant: Foldems LLC, New Brighton, MN (US)

(72) Inventors: Joel Orrie Morris, Roseville, MN (US); Connors Lau, New Brighton, MN (US)

(73) Assignee: Foldems LLC, New Brighton, MN (US)

( * ) Notice: Subject to any disclaimer, the term of this patent is extended or adjusted under 35 U.S.C. 154(b) by 0 days.

(21) Appl. No.: 14/797,523

(22) Filed: Jul. 13, 2015

(65) Prior Publication Data
US 2016/0008726 A1    Jan. 14, 2016

Related U.S. Application Data

(60) Provisional application No. 62/024,453, filed on Jul. 14, 2014.

(51) Int. Cl.
*A63H 3/10*    (2006.01)
*B60R 21/237*    (2006.01)
*A63H 33/00*    (2006.01)

(52) U.S. Cl.
CPC ............... *A63H 3/10* (2013.01); *B60R 21/237* (2013.01)

(58) Field of Classification Search
CPC ............. A63H 3/00; A63H 3/08; A63H 3/46; A63H 33/00; A63H 33/102
USPC ............................. 446/80, 123, 127, 487–488
See application file for complete search history.

(56) References Cited

U.S. PATENT DOCUMENTS

| | | | | |
|---|---|---|---|---|
| 4,214,404 | A * | 7/1980 | Fischer | A63H 33/102 403/3 |
| 6,120,344 | A * | 9/2000 | Brown | A63H 3/08 446/321 |
| 7,395,621 | B2 * | 7/2008 | Carter | G09F 1/06 229/115 |
| 7,654,441 | B2 * | 2/2010 | Billen | B65D 81/368 229/116.4 |
| 7,727,045 | B2 * | 6/2010 | Yasui | A63H 3/46 446/330 |

OTHER PUBLICATIONS

"Two Axis Joint to Download and Make," Sep. 29, 2011, 4 pages. Retrieved from Internet: www.robives.com/blog/twoaxis on Feb. 9, 2016.
Cory Doctorow, "Poplocks and Paper Pose-Ables: papercraft joints for pose-able robots," Mar. 16, 2013, 5 pages. Retrived from Internet: www.boingboing.net/2013/03/16/poplocks-and-paper-pose-ables. html on Feb. 9, 2016.

* cited by examiner

*Primary Examiner* — Kien Nguyen

(57) ABSTRACT

System, methods and figures having rotating joints including a first component comprising a face and an aperture within the face, a second component comprising a face and an aperture within the face, and a connector comprising a panel, wherein the panel comprises an elongated sheet having a first end portion, a second end portion, and a central portion, wherein the central portion is narrower than the first and second end portions. The connector is configured to fit within the apertures of the first and second components to securely adjoin the first component to the second component such that the first and second components are rotatable relative to each other.

20 Claims, 19 Drawing Sheets

THREE DIMENSIONAL FOLDED FIGURES WITH ROTATING JOINTS

BACKGROUND

The art of folding paper into various shapes is well known. In some cases, the paper may be folded into figures such as human or animal shapes, which may be enjoyed as toys. To be more realistic, paper may be folded into a three dimensional shape having a plurality of sides, such as a cube. Multiple three dimensional shapes may be created from separate sheets of paper and assembled together into a figure. In many cases, it is desirable that the separate portions of the figure, such as the torso, head, and limbs, be able to move relative to each other once they are assembled together. However, it is difficult to achieve a secure connection between the components while also allowing for mobility of the components relative to each other. As such, the usefulness of folded paper figures as toys has been limited.

SUMMARY

Various embodiments include systems for assembling figures including component made from sheets of one or more various substrates in which the components are connected to each other and rotate relative to each other by joints. In some embodiments, the system includes a first component comprising a face and an aperture within the face, a second component comprising a face and an aperture within the face, and a connector comprising a panel. The panel may be an elongated sheet having a first end portion, a second end portion, and a central portion, wherein the central portion is narrower than the first and second end portions. The connector maybe configured to fit within the apertures of the first and second components to securely adjoin the first component to the second component such that the first and second component are rotatable relative to each other. For example, the figure may be a human, humanoid, or animal and the first component may be a limb or a head when folded while the second component may be a torso when folded.

In some embodiments, the connector may include a second panel, wherein the second panel is an elongated sheet having a first end portion, a second end portion, and a central portion, wherein the central portion is narrower than the first and second end portions, and wherein the first end portion of the panel is adjoined to the first end portion of the second panel along a first fold line, and wherein the second end portion of the panel is adjoined to the second end portion of the second panel along a second fold line, and wherein there is an aperture between the central portion of the panel and the central portion of the second panels.

In some embodiments, the connector may have an edge which tapers into a recess on one side of the central portion of the connector. In some embodiments, the connector may have an edge which tapers into a recess on both sides of the central portion of the connector. In some embodiments, the edge of the connector may further form a ledge, adjacent to the recesses, on both sides of the central portion of the connector. In still other embodiments, the connector may be a plurality of panels, connected to each other in a side-by-side orientation or end-on-end, configured to be folded between at least two adjacent panels into a zigzag configuration.

In some embodiments, the aperture of the first component is configured to provide a rotating connection to the connector and the aperture of the second component is configured to provide a non-rotating connection to the connector.

The first component may be a sheet configured to be folded into a three dimensional shape having a plurality of sides wherein one of the sides is the face of the first component and wherein the sides and face of the sheet of the first component completely surround an empty space within the component when folded into the three dimensional shape. The second component may be a sheet configured to be folded into a three dimensional shape having a plurality of sides wherein one of the sides is the face of the second component. The connector may be configured to adjoin the first component to the second component with the face of the first component abutting the face of the second component.

The first component, the second component and the connector may all be portions of a single sheet of a paper material and may be outlined by perforated cut lines and/or an edge of the sheet to allow for separation from the sheet. The first component may include a tab and a slot wherein the slot is configured to receive the tab to hold the first component in a folded configuration. The system may include instructional words and/or symbols on one or more elements of the system for directing a user in how to fold the first component into the three dimensional shape, wherein the instructional words and/or symbols are positioned to be unseen after the system is assembled into the figure.

Various embodiments further include methods of creating a figure from a plurality of components. The method may include inserting a first end portion of a connector into an aperture of a first component, wherein the connector comprises one or more panels, wherein each panel comprises an elongated sheet having a first end portion, a second end portion, and a central portion, wherein the central portion is narrower than the first and second end portions; and inserting a second end portion of the connector into an aperture of a second component. The method may further include folding a first sheet into a three dimensional shape comprising the first component, wherein the three dimension shape comprises a plurality of sides and a face, and wherein the aperture of the first component is located within the face of the first component, and folding a second sheet into a three dimensional shape comprising the second component, wherein the three dimensional shape comprises a plurality of sides and a face, and wherein the of the second component is located within the face of the second component. The figure may be a human, humanoid, or animal, for example, in which the first component may be a head or limb of the human or animal, and the second component may be a torso of the human or animals. The first component, the second component, and the connector may be made of a paper material. After inserting the first and second end portions, the connector may securely hold the face of the first component adjacent to and abutting the face of the second component but may allow for rotation of the first component relative to the second component. In some embodiments, the connector may be a plurality of panels oriented side by side, or end on end, and the method may further include folding the connector between the panels.

Still other embodiments includes figures. In some embodiments, the figure includes a first component, a second component, and a connector comprising a plurality of panels, each panel comprising an elongated sheet having a first end portion, a second end portion, and a central portion, in which the central portion of each sheet may be narrower than the first and second end portions, the edges of each panel may taper inward to form a recess on each side of the panel, and the connector connects the first component to the second component and allows rotation of the first component relative to the second component. The panels may be oriented side by side, or end on end, and adjoined along a fold line between each adjacent first end portion and between each adjacent second end portion, and may include an aperture between each adjacent central portion. The first component may include a face of a first planar substrate folded into a three dimensional shape and the second component may include a face of a second planar substrate folded into a three dimensional shape.

BRIEF DESCRIPTION OF THE DRAWINGS

The following drawings are illustrative of particular embodiments and do not limit the scope of the inventions. The drawings are not necessarily to scale and are intended for use in conjunction with the following detailed description. Embodiments of the inventions will be described with reference to the drawings, in which like numerals may represent like elements.

FIG. 19 is perspective view of a connector connecting a first component to a second component, with a phantom image of the components shown in see through.

DETAILED DESCRIPTION

The following detailed description is exemplary in nature and is not intended to limit the scope, applicability, or configuration of the inventions. Rather, the following description provides practical illustrations for implementing various exemplary embodiments. Utilizing the teachings provided herein, those skilled in the art may recognize that many of the examples have suitable alternatives that may be utilized. This application claims priority to U.S. Provisional application No. 62/024,453, filed Jul. 14, 2014 and entitled Planar Substrate Joint, the full disclosure of which is hereby incorporated by reference.

Various embodiments include folded figures having two or more separate but connected components, each component created by folding a separate sheet into a three dimension shape. The three dimensional components are connected by a connector that maintains a secure connection while allowing the shapes to rotate relative to each other. For example, the figures might be human or animal figures, having components including a head, a torso, arms and/or legs, some or all of which may be created by folding a flat sheet into a three dimensional shape. The components may be attached to the torso using connectors that allows them to rotate relative to the torso. As a result, the assembled figure may be able to stand independently and may be useful as a toy, allowing the head and limbs to be moved in a more realistic manner. The components and/or the connectors may be made from paper, and in some embodiments the figure is made entirely from paper.

The figures of various embodiments include any three dimensional structures having multiple components that rotate relative to each other, including not only humans and animals but also humanoid figures (robots, mythological creatures, fantasy figures, etc.), vehicles (cars, trucks, motorcycles, trains, helicopters, etc.), buildings, puzzles, dice, toys, and any other shapes having combined components with a rotating connection. The figures may be provided in one or more sheets, in a flat and unfolded state, for a user to fold and assemble together.

The components of the figure, such as the limbs, may be any shape into which a sheet can be folded, as suited for the figure. For example, the components may be cuboidal, pyramidal, cylindrical, or any other three dimensional shape. In some embodiments, the sheet forms the outer walls of the component, which enclose the empty space of the center of the component. The sheet may include tabs, slots, or other features to hold the sheet in the shape of the component once a user has folded it. Once the sheets are folded into the components, they can be assembled by the user into the completed figure using the connectors.

Figure 1:
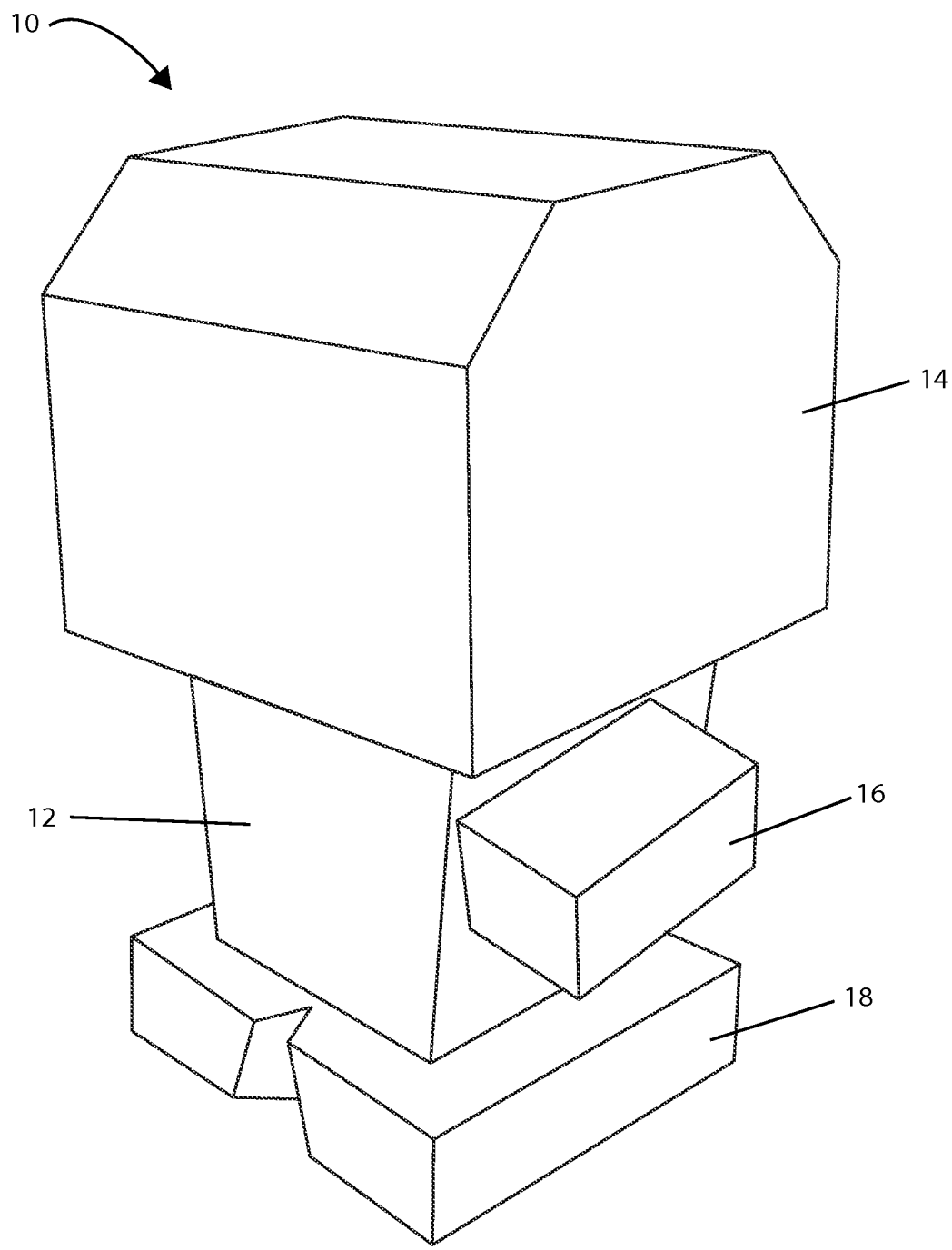
FIG. 1 is a perspective view of a figure according to various embodiments.
Figure 10:
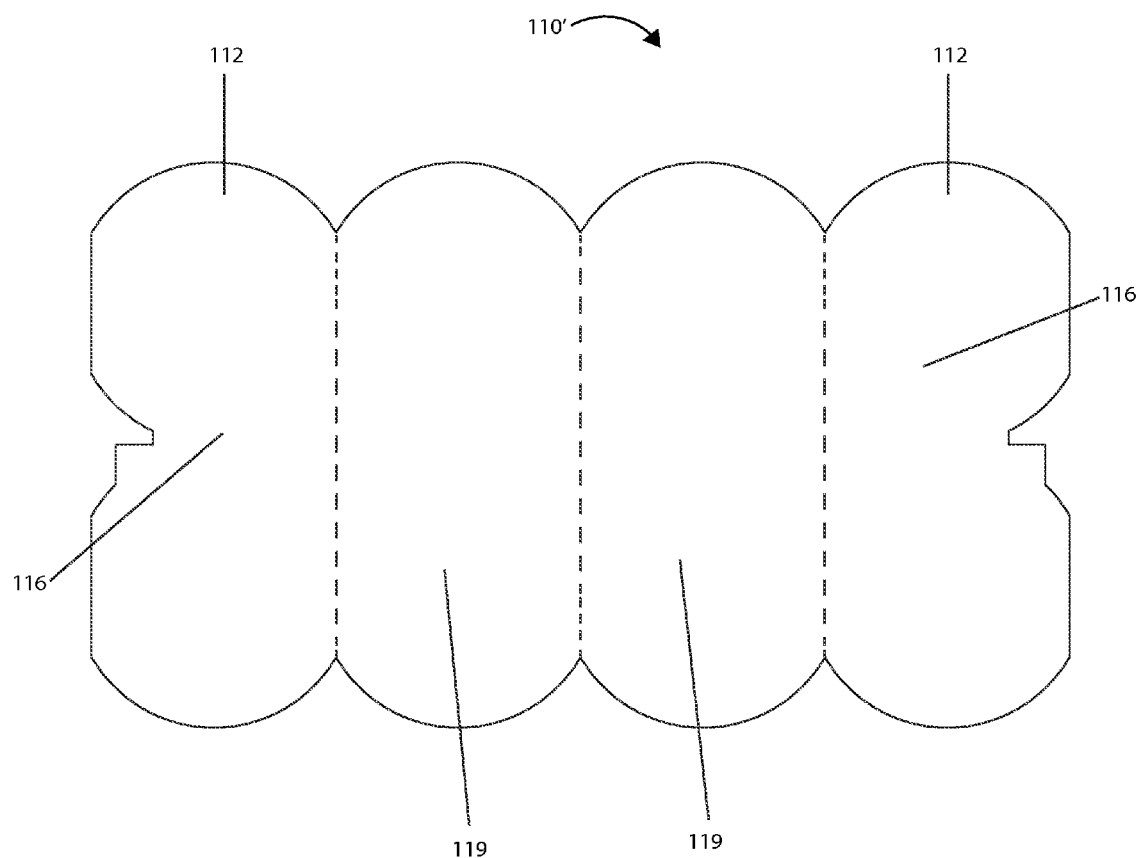
FIG. 10 is a top view of another alternative connector according to various embodiments.

An example of a three dimensional folded figure having multiple rotatable components is shown in FIG. 1. The FIG. 10 is a human type and includes separate components of various shapes including a torso 12, a head 14, a pair of arms 16 (only one can is shown), and a single component for the feet 18. Each of the head 14, arms 16 and feet 18 are connected to the torso 12 by connectors which allows them to rotate relative to torso. The portions of the sheet of each component which form the outer surface of the component may be printed with features to provide further detail to the FIG. 10, such as facial features (eyes, mouth, etc.), clothing, shoes, skin tones, hair, fur, feathers, and body parts. For example, this printing may distinguish the legs from the chest as separate upper and lower portions of the torso 12, or the hands at the ends of the arms 16. In other embodiments, the printing may provide details such as windows, doors, wheels, faux material effects (to give the appearance of metal, wood, cloth, leather, rubber, or glass, for example) or other markings or details which may provide skeuomorphism.

Figure 2:
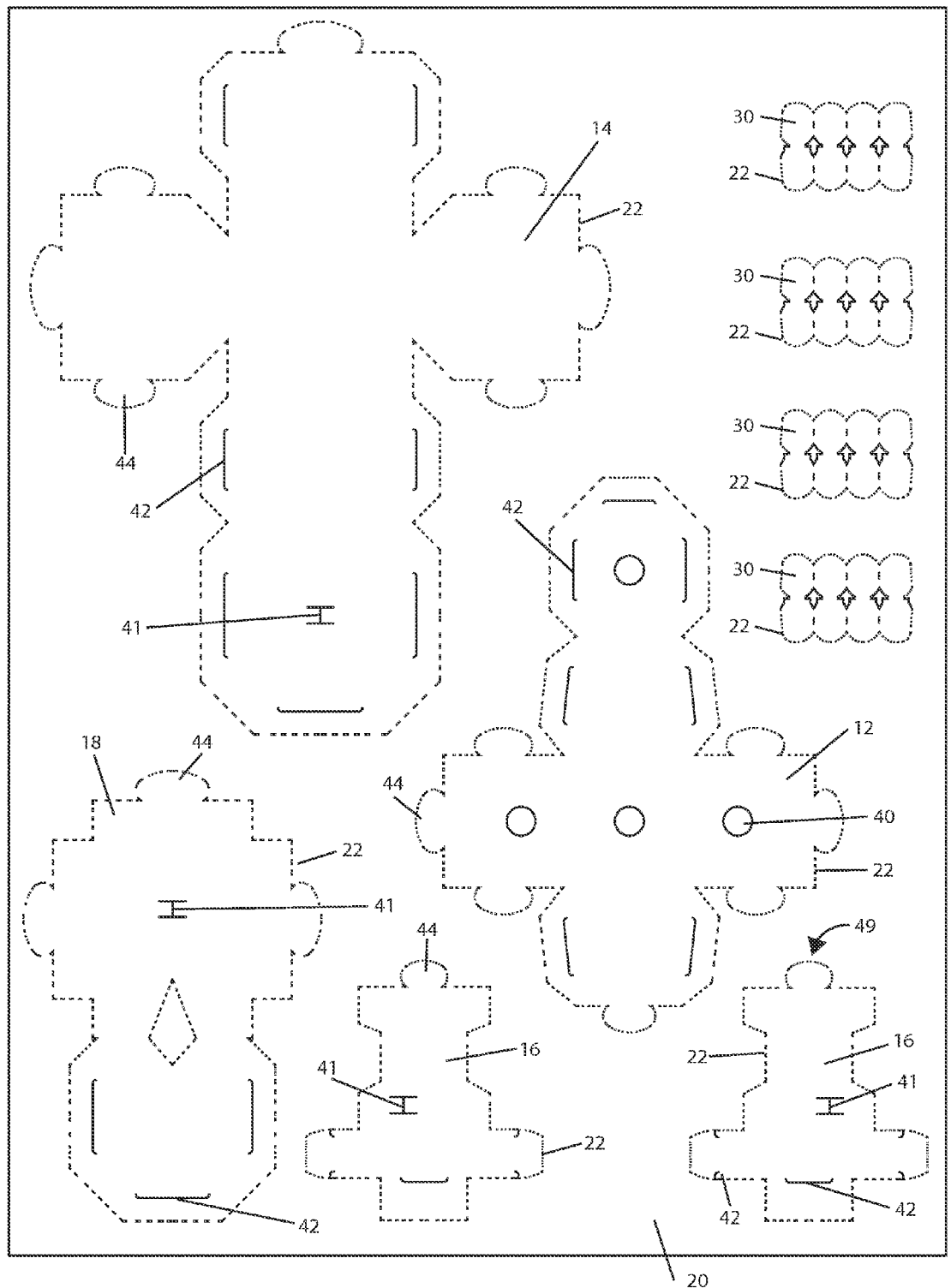
FIG. 2 is a top view of a sheet for creating the figure of FIG. 1.

The component sheets which are folded by a user into the components may be provided to the user together in a single sheet or multiple sheets, from which the separate component sheets may be separated by a user such as by tearing along perforated lines or cutting along guidelines. Alternatively, the components sheets may already be provided to a user as separate sheets. An example of such an embodiment in which all of the components sheets are provided in a single sheet is shown in FIG. 2, which shows a single sheet 20 including all of the components of FIG. 1 in a flat and unfolded state. In this embodiment, the outer edges of each of the component sheets are outlined by perforations 22 extending through the sheet 20, which allow the components sheets to be separated from the sheet 20 by the user along the perforations 22. After the component sheets are separated from sheet 20 by a user, the user can fold them and connect them together using connectors 30, as described further below, to create the figure shown in FIG. 1. In this example, the connectors are also outlined by perforations 22 to allow a user to easily remove them from sheet 20 by tearing along the perforations 22. Alternatively, the component sheets and/or connectors 30 may be provided on multiple sheets each including one or more component sheets and/or connectors 30, and/or they may be provided each separately, already ready for folding, without the need to separate them from a larger sheet.

The component sheets may include decorative printing as described above, which is visible in the finished folded and assembled form of the figure. In addition, the component sheets and/or the connectors 30 may include instructional printing, which may include words and/or symbols such as arrows and fold lines, instructing a user in how to fold the component sheets and the connectors 30 and how to use the connectors 30, in order to create the finished three dimensional FIG. 10. The instructional printing may be provided on portions of the component sheets which are not visible after the component sheet is folded and assembled into a FIG. 10. The instructional printing on the connectors 30 may be hidden when the connector 30 is used in a FIG. 10 because the connector 30 is located inside of two adjacent figure components, bridging the adjacent components with little or no space between them. The figure components may further include one or more apertures 40 or slits such as I-shaped slit 41 allowing the material of the sheet to be folded open a square aperture from the I-shaped slit 41. Connector 30 may be inserted into aperture 40 or 41 by a user. The component sheets may further include one or more slits 42, extending through the figure component sheet, to provide for secure folding of the sheet into a three dimensional component, such as for the insertion of a tab element 44 or an edge of the figure component sheet, to secure the component sheet in the folded configuration.

The connector according to various embodiments allows for a first and second figure component to be connected in secure, abutting engagement while allowing for rotation of the first and second components relative to each other through 360 degrees of rotation. In some embodiments, the light friction of the abutting alignment and the components allows the components to maintain their relative positions when not being manipulated, but allows them to rotate easily when manipulated by a user into new positions, which may then be maintained by the friction.

The connectors according to various embodiments have a generally hourglass type shape, being elongated with a narrowing in the middle and widening at each longitudinal end. They may be made from a single, unfolded hourglass shaped sheet. Alternatively, the connector sheet may be folded one or more times, such as in an accordion fashion, to strengthen the connector and give it greater size (depth). In embodiments in which the connector sheet is folded, the connector may include a plurality of hourglass shaped portions, connected and side-by-side, or end-on-end, which may be folded along the connection line between them.

Figure 3:
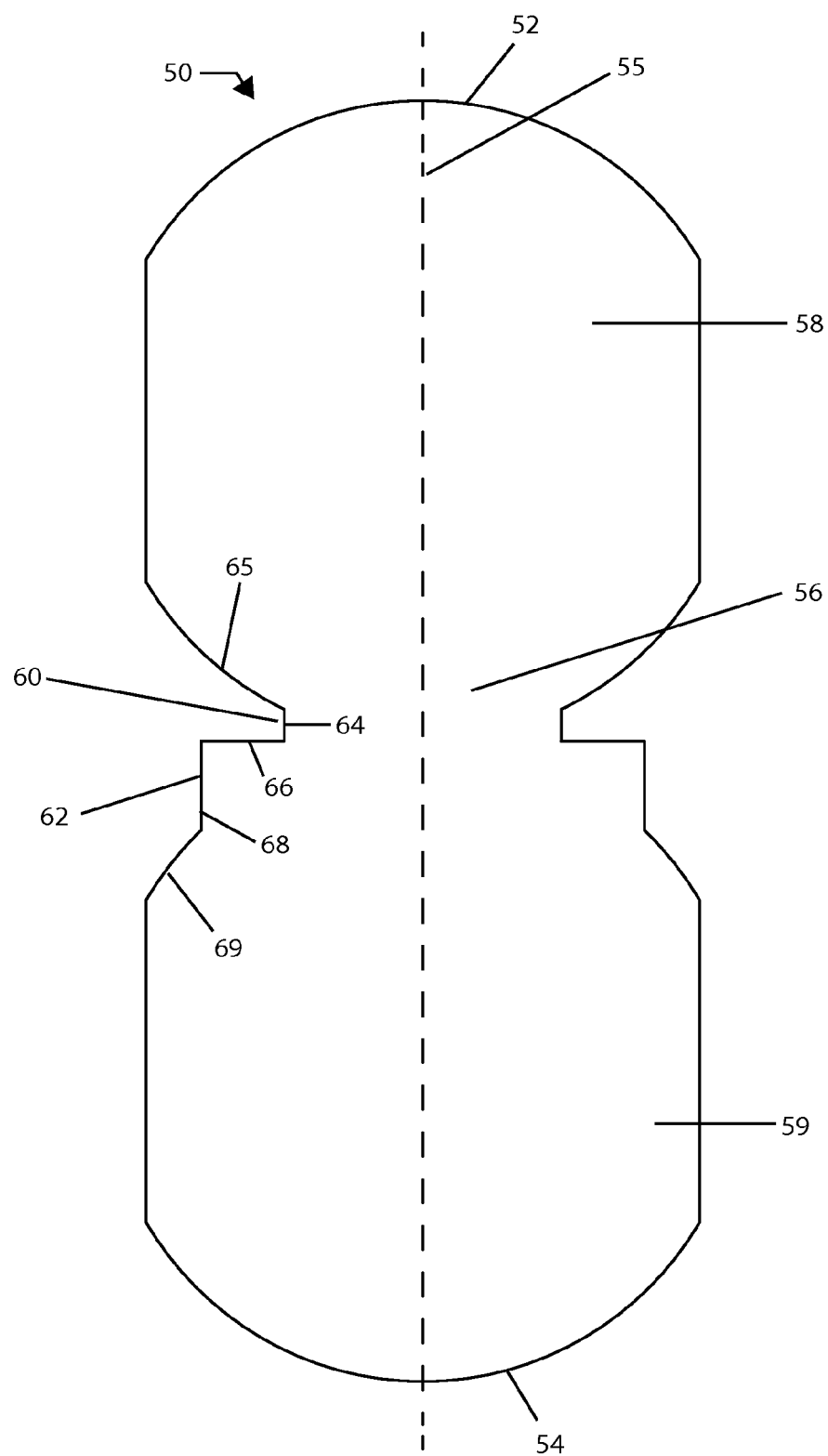
FIG. 3 is a top view of a connector according to various embodiments.
Figure 4:
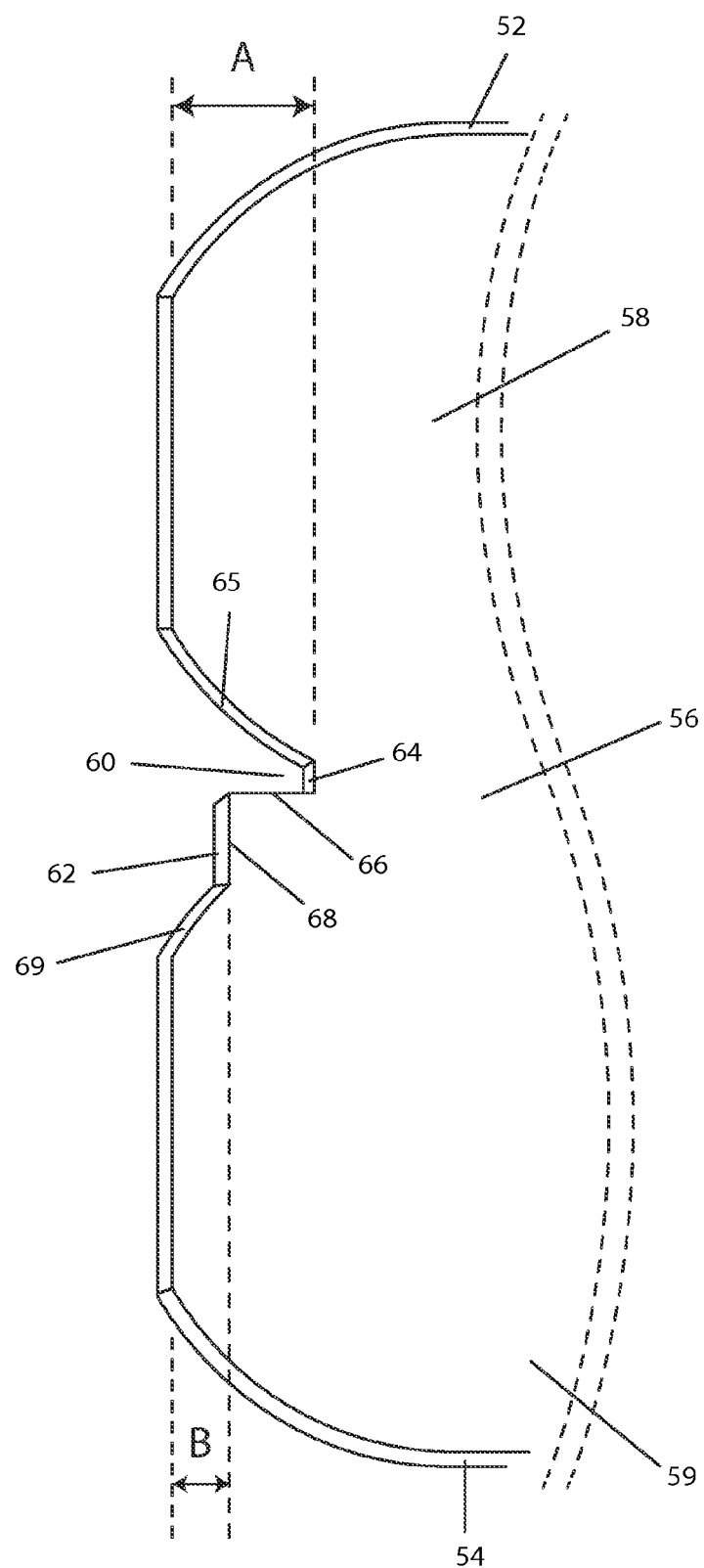
FIG. 4 is a perspective view of a portion of the connector of FIG. 3.

One embodiment of a connector 50, having a single sheet portion, is shown in FIG. 3. FIG. 4 shows a perspective view of a portion of the connector of FIG. 3. The connector 50 is an elongated flat sheet, having first and second ends 52, 54 which may be rounded as shown to assist in insertion into an aperture of a component and a longitudinal axis 55. The connector 50 includes a narrowed central portion 56 between a first and second end portion 58, 59 which are wider than the central portion 56.

In the embodiment shown in FIGS. 3 and 4, the edges of the connector 50 at the central portion 56 form a recess 60 and a ledge 62 on each side of the connector 50. The recess 60 is located at the narrowest portion of the central portion 56. The depth of the recess 60, relative to the widest portion of the connector 50, is shown by distance A. The ledge 62, is stepped out from the recess 60, such that the central portion 56 is wider at this location. The depth of the ledge 62, relative to the widest portion of the connector, is shown by distance B. It can be seen that distance A is greater than distance B. Recess 60 is defined by the edges of the connector 50 which form a bottom 64, a first side 65 and a second side 66. First side 65 tapers inward toward the bottom 64, while second side 66 is perpendicular to the bottom 64 and to longitudinal axis 55. Ledge 62 is defined only by the edges of the connector 50 which form a bottom 68 and only a single side 69, and as such forms a ledge, relative to the first recess 60. Recess 62 and ledge 64 are connected by the second side 66. In this embodiment, recess 62 and ledge 64 are located on both sides of the connector 50, directly across from each other.

Figure 5:
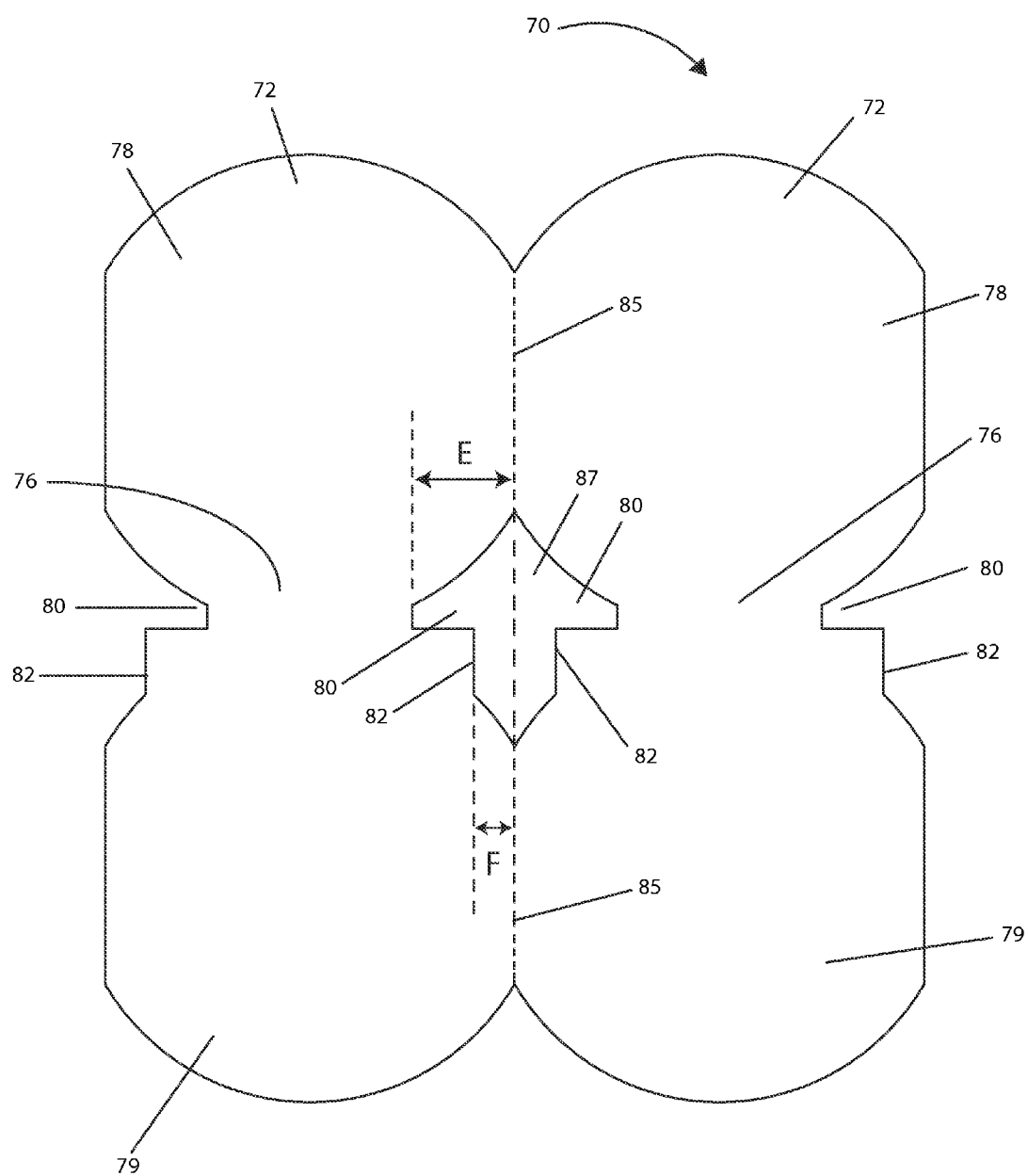
FIG. 5 is a top view of an alternative connector according to various embodiments.
Figure 6:
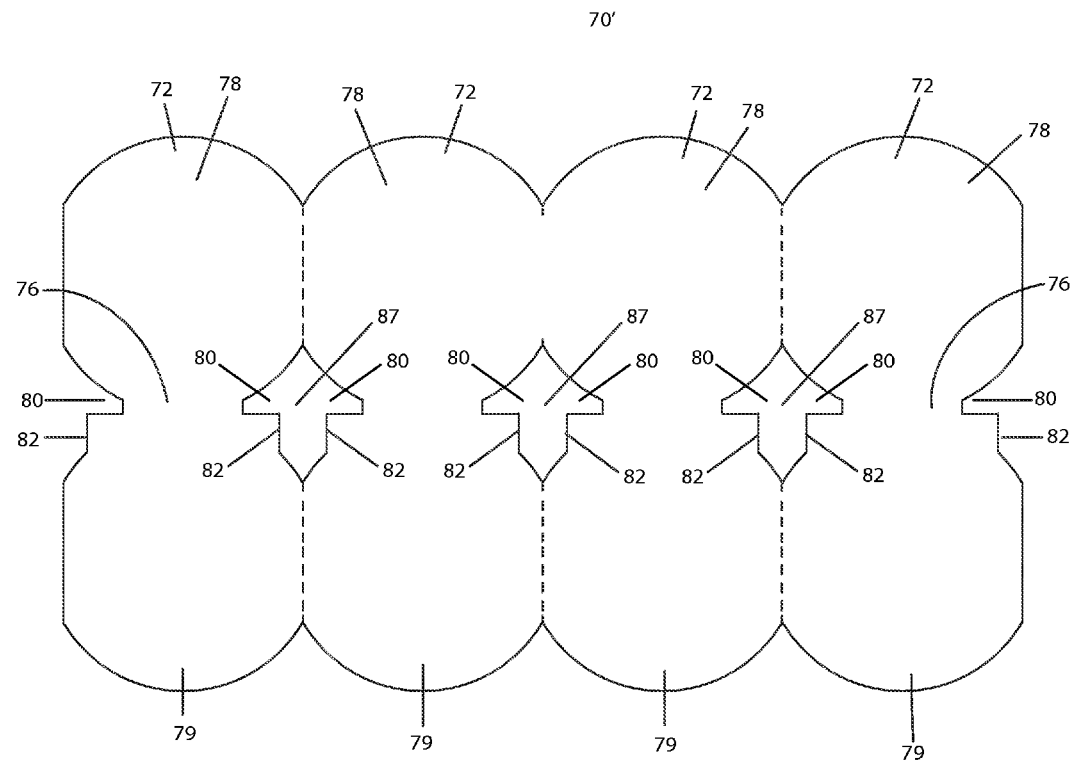
FIG. 6 is a top view of another alternative connector according to various embodiments.
Figure 7:
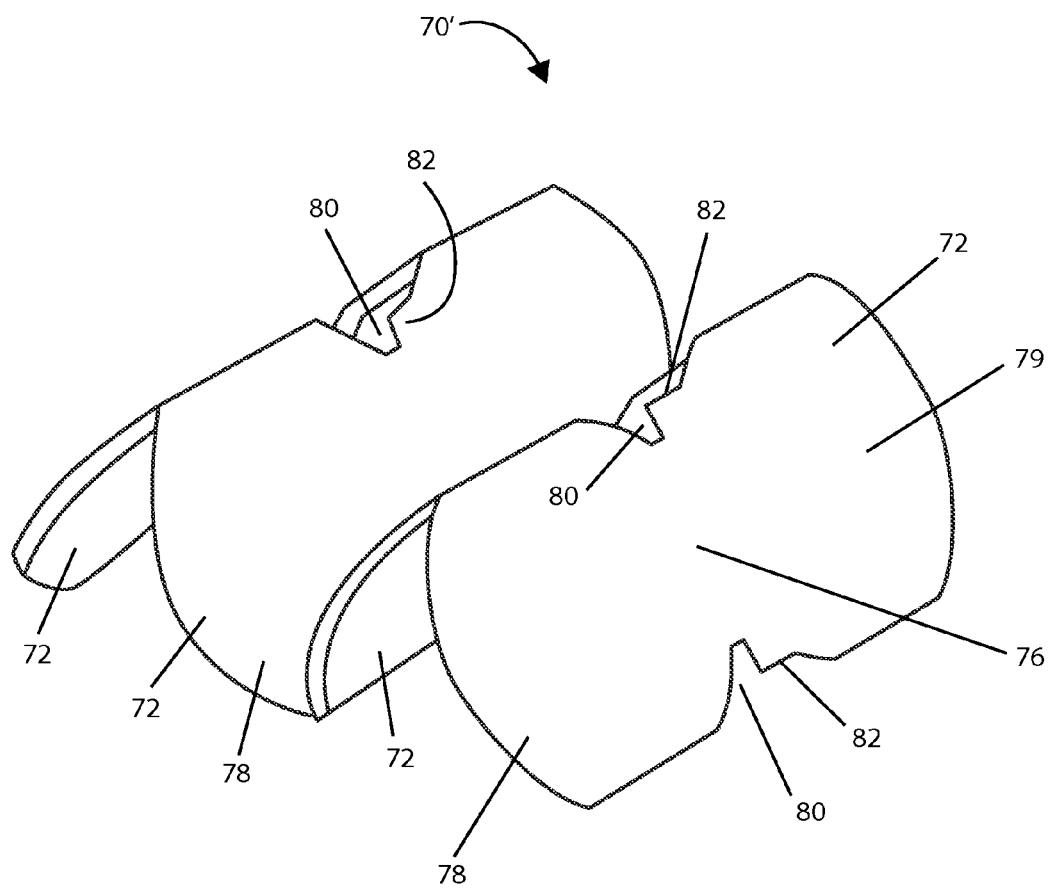
FIG. 7 is a perspective view of the connector of FIG. 6 folded into a zigzag configuration.

In various embodiments, the connectors may include a central portion having a recess and a ledge, like those described above, but the connector may include multiple panels, which are folded against each other, between each panel, into a zigzag shape. Examples of such embodiments are shown in FIGS. 5-7. In FIG. 5, connector 70 includes two panels 72, while in FIGS. 6 and 7 the connector 70' includes four panels 72. Each panel 72 includes a narrowed central portion 76 and first and second end portions 78, 79 and a recesses 80 and ledges 82 akin to those described with regard to the embodiment shown in FIGS. 3 and 4. However, the adjacent first end portions 78 and adjacent second end portions 79 of each panel 72 are connected and configured (and optionally marked) to be folded by a user along fold line 85, where the panels 72 adjoin each other. Furthermore, the narrowing of the central portion 76 of adjacent panels 72 and the identical and symmetrical shaping of each panel 72 results in an aperture 87 between adjacent panels 72. While the panels 72 in these figures are connected in a side-by-side orientation, they may alternatively be connected in an end to end orientation, and may be folded into a zig-zag shape where the panels connect to each other at their ends. In various alternative embodiments, whether the panels are aligned side-by-side or end-to-end, the zigzag shape of the connector may be created by folding only between certain adjacent panels but not all adjacent panels, such as every other panel, while other adjacent panels remain in the same plane as each other.

Figure 8:
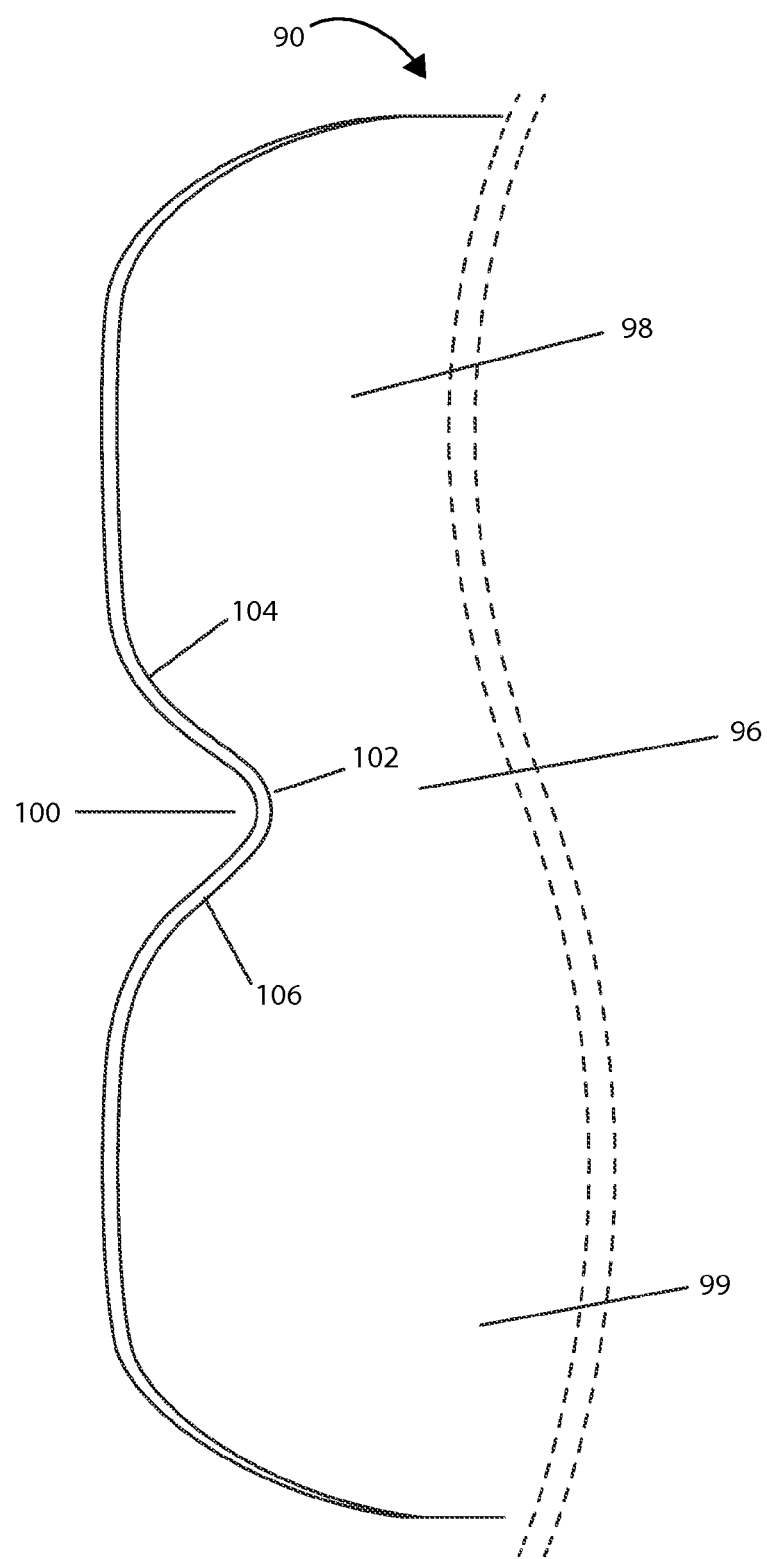
FIG. 8 is a perspective view of another alternative connector according to various embodiments.

A perspective view of a portion of another alternative embodiment of a connector 90 is shown in FIG. 8. The connector 90 includes a narrowed central portion 96, a first end portion 98 and a second end portion 99. The central portion 96 includes only a single recess 100 having a bottom 102, a first side 104, and a second side 106. The sides 104, 106 taper smoothly from the edges of the end portions 98, 99 toward the bottom 102 to form the recess 100. As in the embodiments described above, the connector 90 may be a single panel or may include multiple panels, such as 2, 3 or 4 identical panels, which can be folded, such as in an accordion fashion, along fold lines adjoining adjacent panels. The recess 100 may be located on each side of the panel 90, directly across from each other, as in connectors 30, 50 and 70. Alternatively, the recess 100 may be located on only one side of panel, as in FIGS. 9 and 10, described below, or may be displaced (out of alignment) as in FIG. 11.

Figure 9:
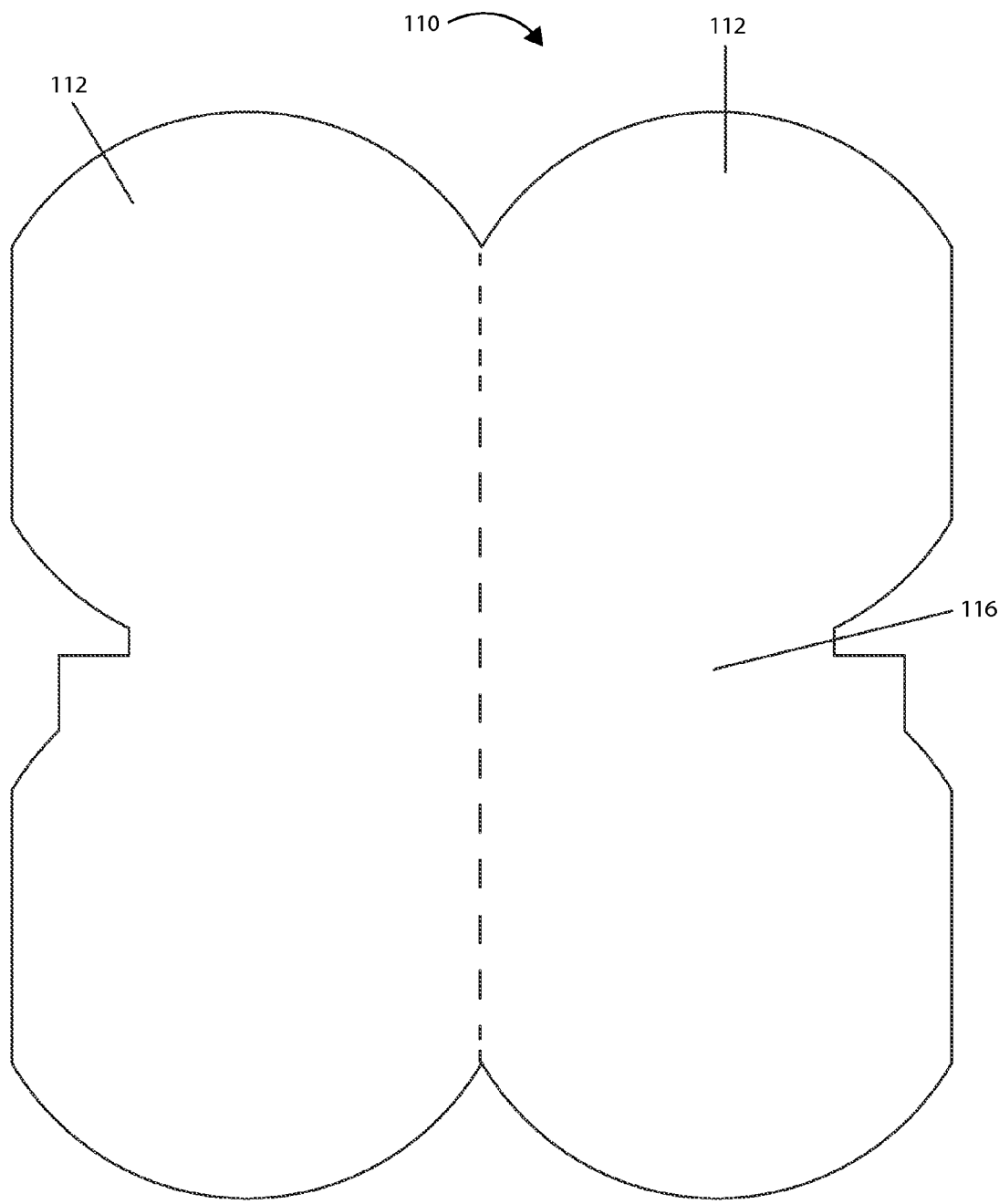
FIG. 9 is a top view of another alternative connector according to various embodiments.

In some embodiments, the central portion 116 of the panels 112 of the connector 110 may be narrowed only on one side, as shown in FIG. 9, with the opposing side being straight. A connector having a single panel may likewise be narrowed in the central portion on only one side and straight on the other side (not shown). In embodiments including more than two panels, such as the connector 110' shown in FIG. 10, the panels 112 at each end may be narrowed on their free sides only, and may be straight on the sides with are adjoined to adjacent panels 119, along which they are folded by a user, while the central panels 118 may be straight along both sides and may thus have no narrowing of the central portion 116.

Figure 11:
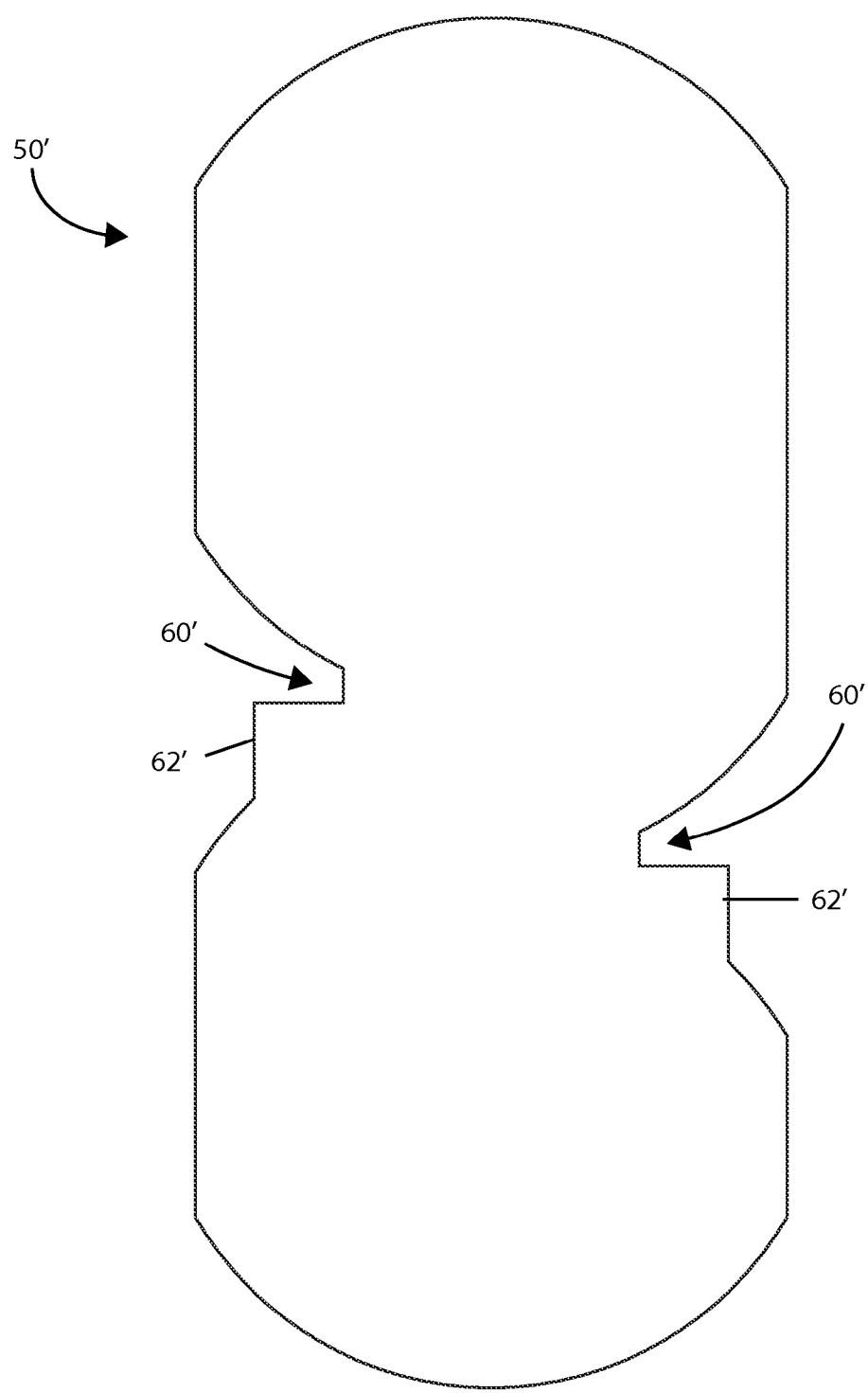
FIG. 11 is a top view of another alternative connector according to various embodiments.

In still other embodiments, the narrowing may be achieved by recesses which are not symmetrically aligned relative to the longitudinal axis of the panel. For example, as shown in FIG. 11, the recess 60' and ledge 62' of connector 50' may be displaced, relative to each other, on each side of connector 62'. While this embodiment includes only a single panel, other embodiments may include multiple panels.

The connectors of various embodiments may be used to connect two component sheets through apertures in the component sheets. Each component sheet may be folded into a three dimensional component having multiple side faces which may be curved or flat. The side faces may include apertures for connecting the component to another component using a connector.

The aperture in the component face, through which the connector is inserted, may be any shape. For example, it may be square, triangular, round, oval, or any other shape. The aperture may be a complete hole, which is present in the component sheet when provided to the user, or it may be provided with a perforated edge and require the user to punch out the sheet material to form the aperture. In still other embodiments, the edge of the aperture may be partially cut, such that the user may fold the sheet material back (toward the inside of what will be the three dimensional component) in the nature of a door, without detaching the sheet material from the component in the aperture.

The aperture is sized and shaped to allow insertion of the connector but to retain the end portion of the connector after it is inserted through the aperture. This may be accomplished due to a combination of one or more features including the shape of the aperture, the shape of the connector, and the flexibility of the material comprising the connector. Thus, for a circular aperture, the width of the end portion of the connector may be greater than the diameter of the aperture, while the width of the central portion of the connector may be less than the diameter of the aperture. The end portion of the connector may be flexed by the user to insert allow it into and through the aperture. Once inserted the end portion has passed through the aperture and is no longer under a flexing force by the user, the end portion may spring back into a more flat form, thereby widening and holding the connector in place with the central portion within the aperture.

Figure 12:
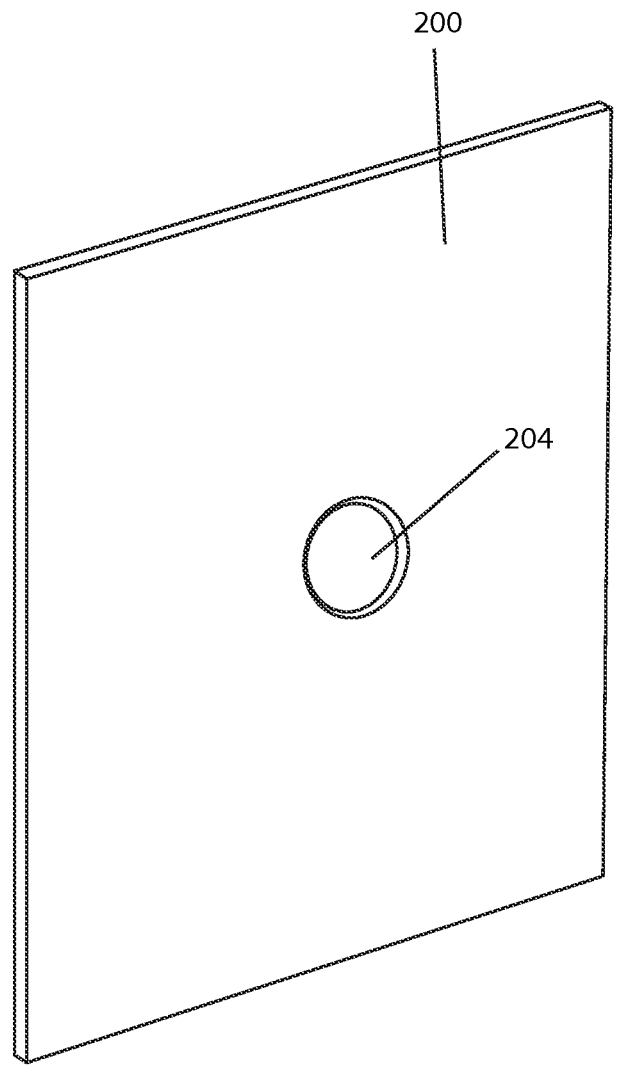
FIG. 12 is a perspective view of a sheet including an aperture according to various embodiments.
Figure 13:
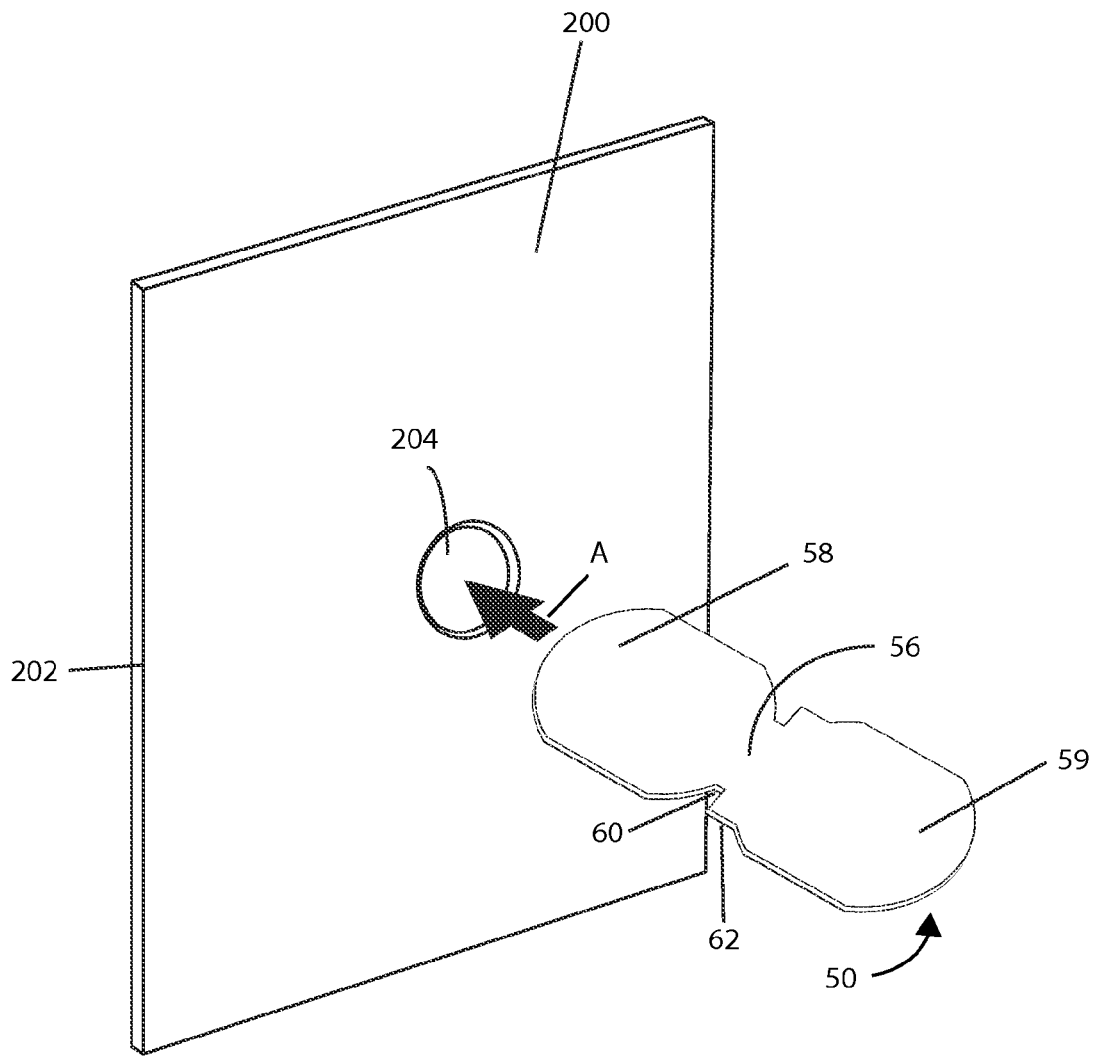
FIG. 13 is perspective view of the insertion of a connector into the aperture of FIG. 12.

An example of insertion of a connector into a round aperture in a sheet is shown in FIGS. 12 and 13. The connector 50 is a single panel style connector having a recess 60 and ledge 62 in the central portion, but any of the various connector embodiments described herein could be used alternatively. In this example, the sheet 200 is a flat panel having side edges 202 and an aperture 204 which is circular in shape. Alternatively, the sheet 200 could be folded one or more times to form a 3 dimensional shape. The connector 50 is inserted into the aperture 204 by a user as shown by arrow A which depicts the direction of insertion. The rounded shape of the leading edge of the first end 58 helps with this insertion. Furthermore, because the connector is flexible, it may be lightly bent or curved by the user to reduce the width of the first end 58. Once the first end 58 passes through the aperture 204 and the central portion 56 is within the aperture 204, the light bending or curling force applied by the user may be released, such that the first end 58 springs back to its original shape and original width, which is wider than the diameter of the aperture 204.

Alternatively, if the aperture in the component is square or rectangular, the width (or shortest dimension) of the square or rectangle may be less than that of the end portion of the connector but may be greater than that of the central portion of the connector. However, the diagonal dimension of the square or rectangle, or the length (or longest dimension) of the rectangle, may be greater than the width of the end portion of the connector. Thus, the end portion of the connector may fit through the square or rectangle when inserted diagonally or parallel to the length of the aperture. Once inserted through the aperture, the connector may be turned such that the plane of the end portion is extending across and parallel to the width (the narrower dimension) of the aperture, such that the connector is secure. In particular, if the width of the central portion is only slightly narrower than the width of the aperture, such that there is friction between them once turned into this parallel orientation, the connection may be particularly secure. Such a turning method, to secure the connector in the aperture, may likewise be used with an oval aperture. That is, the end portion of the connector may be inserted through the oval shaped aperture with the connector panel (or panels) parallel to the long axis of the aperture. Once the central portion of the connector is within the aperture, the connector may be turned such that it is parallel to the short axis of the aperture, with the edges of the central portion of the connector now abutting the edge of the aperture to hold the connector within the aperture by friction.

Figure 14:
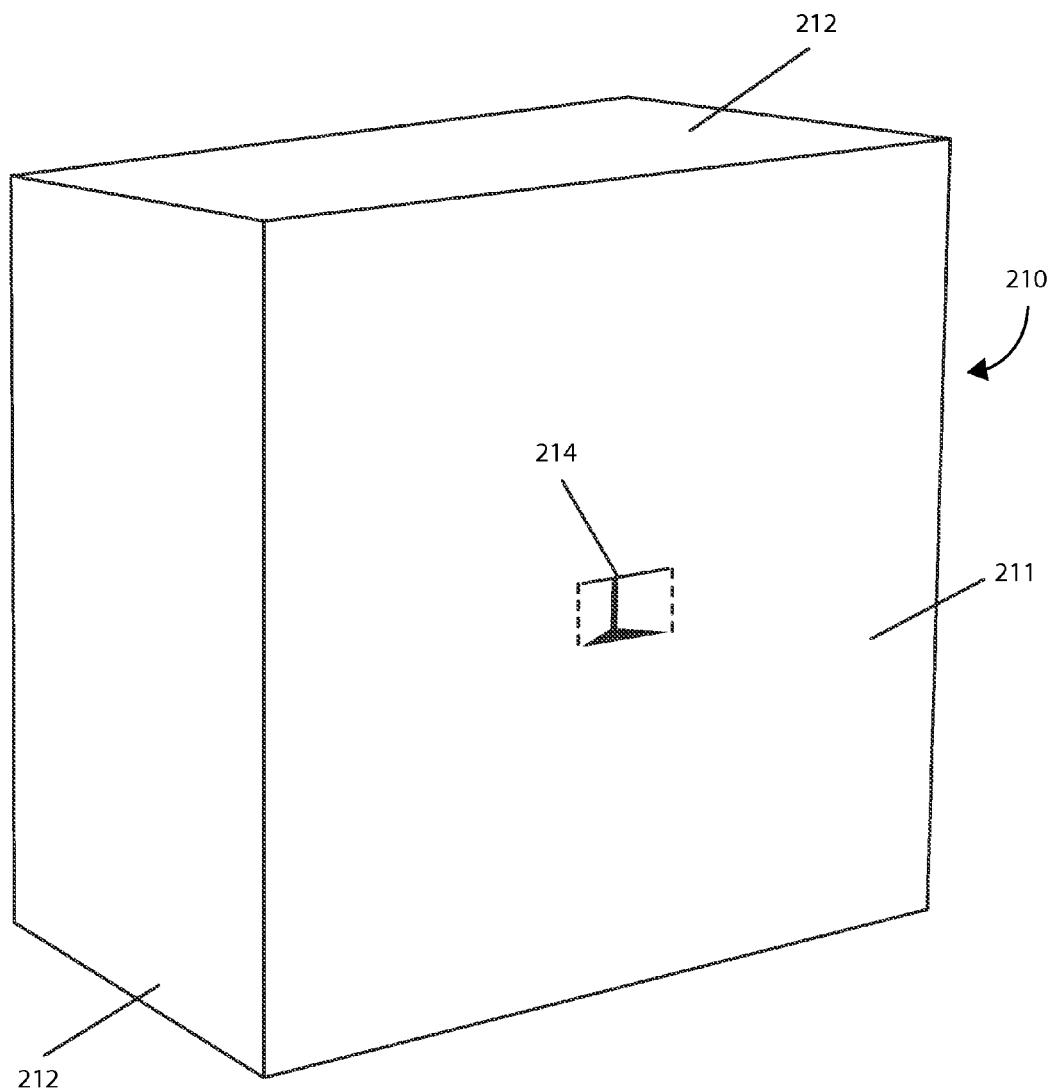
FIG. 14 is a perspective view of a component including an aperture according to various embodiments.
Figure 15:
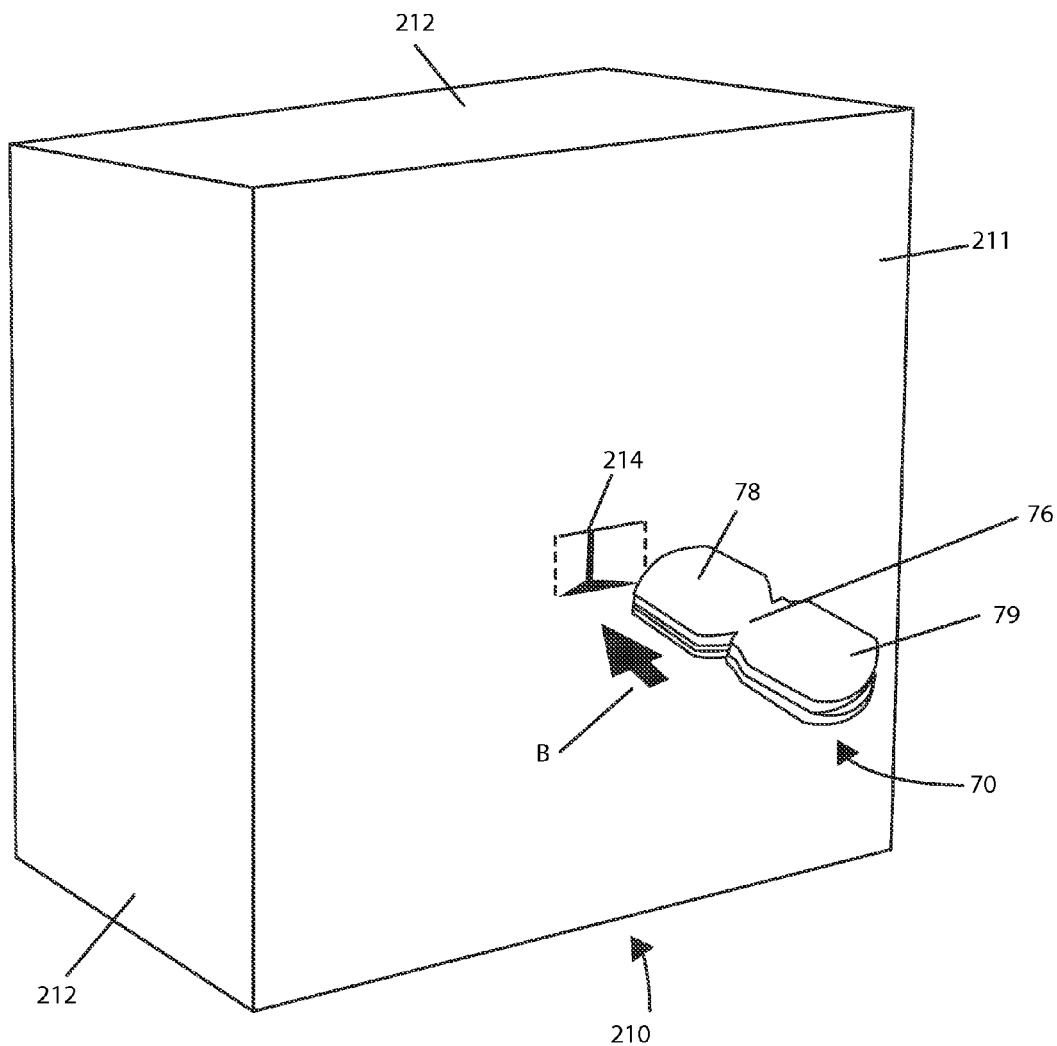
FIG. 15 is a perspective view of the insertion of a connector into the aperture of FIG. 14.
Figure 16:
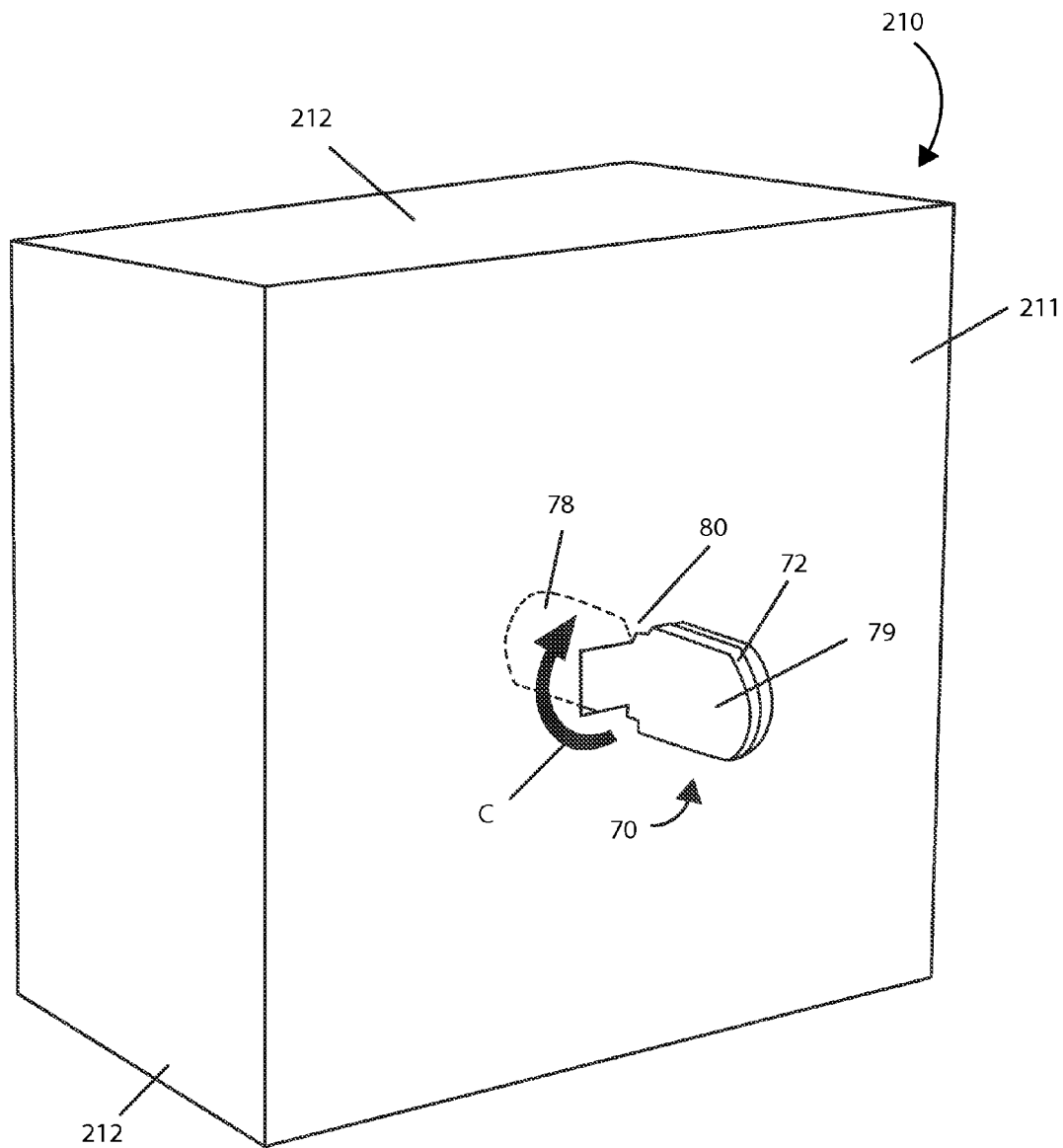
FIG. 16 is a perspective view of turning the connector within the aperture of FIGS. 14 and 15.

An example of a connector used with a sheet having a rectangular aperture is shown in the partial perspective view of FIGS. 14-16. In this example, the component 210 includes planar face 211 and sides 212, forming a three dimensional cuboidal component which is hollow inside. The aperture 214 is rectangular, and is formed by a user folding back small panels in the face 211 formed by an H-shaped cut, though other types of apertures could be used. The connector 70 in this example is a multi-panel connector folded accordion style, though other connector embodiments such as a single panel connector could alternatively be used. The connector 70 is held by the user with the panels 72 compressed together to reduce the volume of the connector and the first end portion 78 is inserted into the aperture 214 with the panels 72 of the first end portion 78 parallel to the length of the rectangular aperture 214 as indicated by arrow B, which depicts the direction of insertion of the connector 70. Once the first end portion 78 has passed through the aperture 214 and the central portion 76 is within the recess, the user rotates the connector 70 about its longitudinal axis, as indicated by arrow C, to place the panels 72 parallel to the width (the shortest dimension) of the aperture 214. As shown in FIG. 16, the width of the central portion 76 of the connector panels 72 and the width of the aperture are configured such that this rotation secures the connector 70 within the aperture 214, with the sheet at the edges of the aperture 214 positioned within the recesses 80 on both sides of the connector 70. The first end portion 78 can be seen in phantom within the three dimensional component 210 in FIG. 18. Once the connector 70 is secured into position, the user releases the connector 70, such that the panels 72 are no longer compressed together but rather the accordion folding of the panels 72 allows the connector 70 to spring into a zigzag configuration, expanding to a greater volume, thereby further strengthening the connection between the connector 70 and the component 210.

Once one end portion of a connector is inserted through the aperture of a first sheet and optionally secured in position, either by turning or by automatically returning to a flat configuration, the other end portion of the connector protects out of the aperture at a right angle relative to the first sheet as the free end portion. When the first sheet is a face of an enclosed three dimensional component, which may be hollow in the middle, the inserted end portion may be enclosed within the component such that a user is unable to grasp the inserted end portion of the connector. This makes insertion of the free end portion of the connector through an aperture of a second sheet more difficult, since the user cannot hold the inserted end portion to prevent the connector from being pushed deeper and possibly entirely through the aperture of the first sheet, but it can be accomplished due to the designs of the connectors of various embodiments.

In embodiments in which the connector has a single recess and no ledge, such as connector 90 of FIG. 8, the flaring of the ends 98, 99, are sufficient to hold the connector 90 in place within an aperture of a first sheet as the second end 99 is inserted into an aperture of a second sheet. That is, width of the ends 98, 99 may be greater than the distance across the aperture. In some embodiments, the width of the central portion 96 may be sized to fit snugly within the aperture of the first sheet, with the edges of the central portion abutting the sides of the aperture, to further secure the connector 70 within the aperture. In embodiments in which the connector includes multiple panels, folded accordion style, the increased volume of the connector due to the accordion folding after the end portion is inserted and released may further secure the connection.

Figure 17:
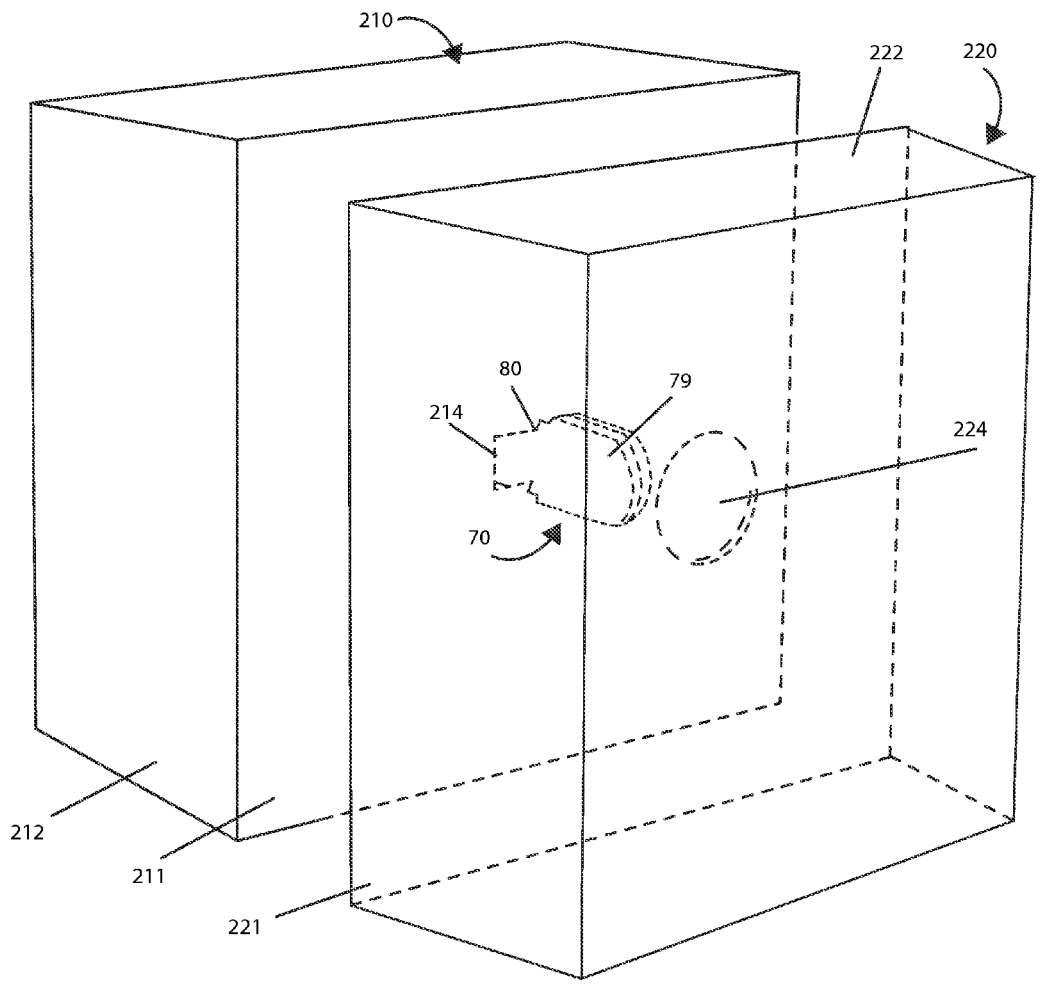
FIG. 17 is a perspective view of further inserting the connector of FIGS. 16-18 into the aperture of a second component.
Figure 18:
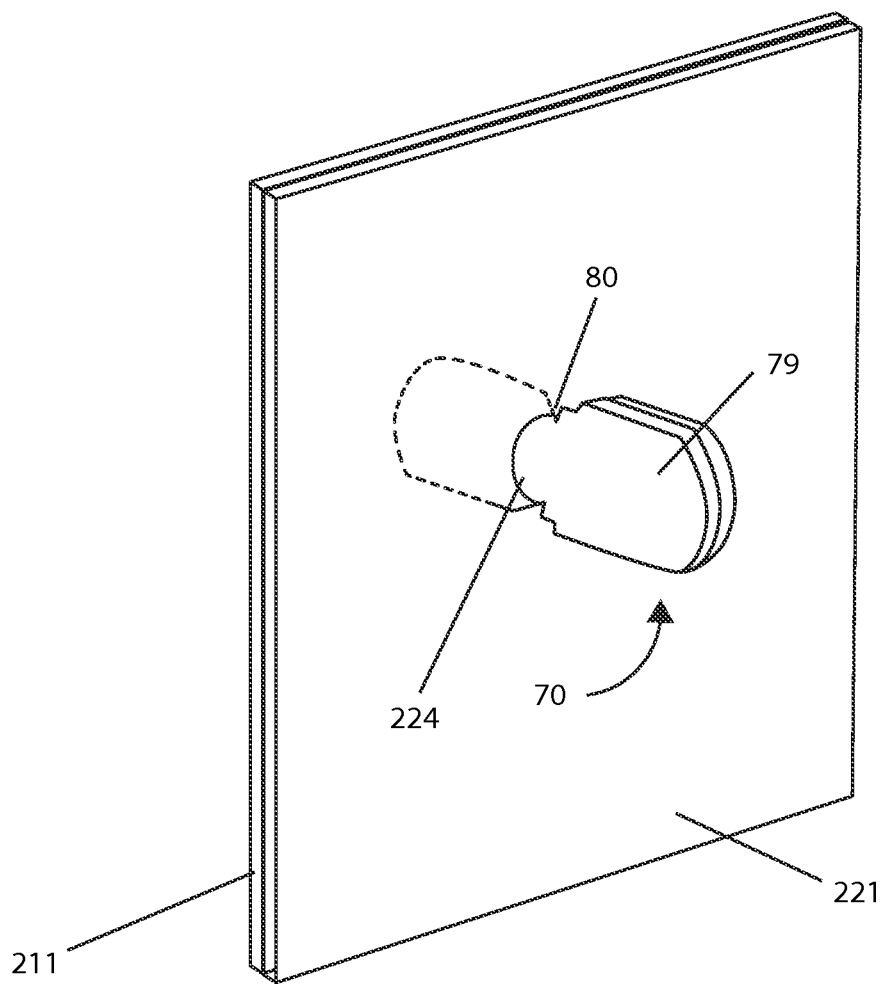
FIG. 18 is a perspective view of a connector connecting the faces of the first and second components of FIG. 17.

In embodiments in which the connector has a recess and a ledge, the first end portion of the connector may be inserted into the aperture of the first sheet such that the recess is oriented closer to the aperture than the ledge. In this way, the edges first sheet around the aperture can fit into the recess, as shown in FIG. 16. Referring to the connector shown in FIG. 3, it can be appreciated that once the edges of the sheet are in position in the recess 60, any force to further insert or to remove the connector 50 from an aperture will cause the sheet to abut sides 65 and 66 of the recess 60. For example, as shown in FIG. 17, when the second end portion 79 of the connector 70 (as seen through the second component 220 in phantom) is inserted into an aperture 224 in face 221, this action may cause a force may be applied to the connector 70 urging it to insert further through the aperture 214 of the first component 210. However, the connector 70 maintains its position due to the first face 211 abutting the side 66 of the first recess 60 in the connector. Because the side 66 is not tapered but rather is perpendicular to the longitudinal axis of the connector 70 and is parallel to face 211 of the first component 210, it provides an improved ability to hold the connector 70 in place as the second end portion 79 is inserted into the aperture 224 of the second component 220. Once the connector 70 is in position as shown in FIG. 18 (which shows only the faces of the first and second components), the faces 211, 221 of the first and second components 210, 220 are parallel to and abutting each other. The edge of the face 211 around the square aperture 214 of the first component 210 securely hold the connector 70 in the recess 60 after the connector 70 is turned into position, resisting further rotation, insertion, or removal of the connector 70 from the aperture 214. The round aperture 224 of the second face 221 holds the second component 220 adjacent to the first sheet but allows the second component 220 to be rotated by a user about the longitudinal axis of the connector 70. In this way, first and second components 210, 220, can be rotated relative to each other while maintaining a secure connection. Configurations such as these allow the connector to be inserted into the aperture and then twisted such that it is the connector held in place by the edges of the aperture, providing a secure connection in which the connector and the component resist rotating with respect to each other. This non-rotating connection between a first component and a connector may be used in combination with a second component having an aperture which allows for rotation of the component relative to the connector, such as a component having a circular aperture with a sufficient diameter to allow rotation of the component relative to the connector. The aperture of the second component may further allow for it to be easily removed from, and replaced on the connector. In this way, the connector may adjoin a first and a second component together in abutting relationship, with the first component connected to the connector in a secure non-rotating manner and the second component connected in a removable, replaceable, and rotating manner. Furthermore, multiple different components, each having an aperture for a removable, rotating type of connection to the connector, may be provided as part of a set of components, each of which may be used interchangeably with the first component. That is, the first component may be engaged with the connector in a secure and non-rotating manner. The second, third, and optionally additional components may include apertures which allow the second components to be connected with the first component. The second component may be removed later and replaced with the third component, such that now the first and third components are connected. In this way, a single kit may include a first component, such as a torso, which may be used with a selected one of a set of various other components such as various heads, etc.

Figure 19:
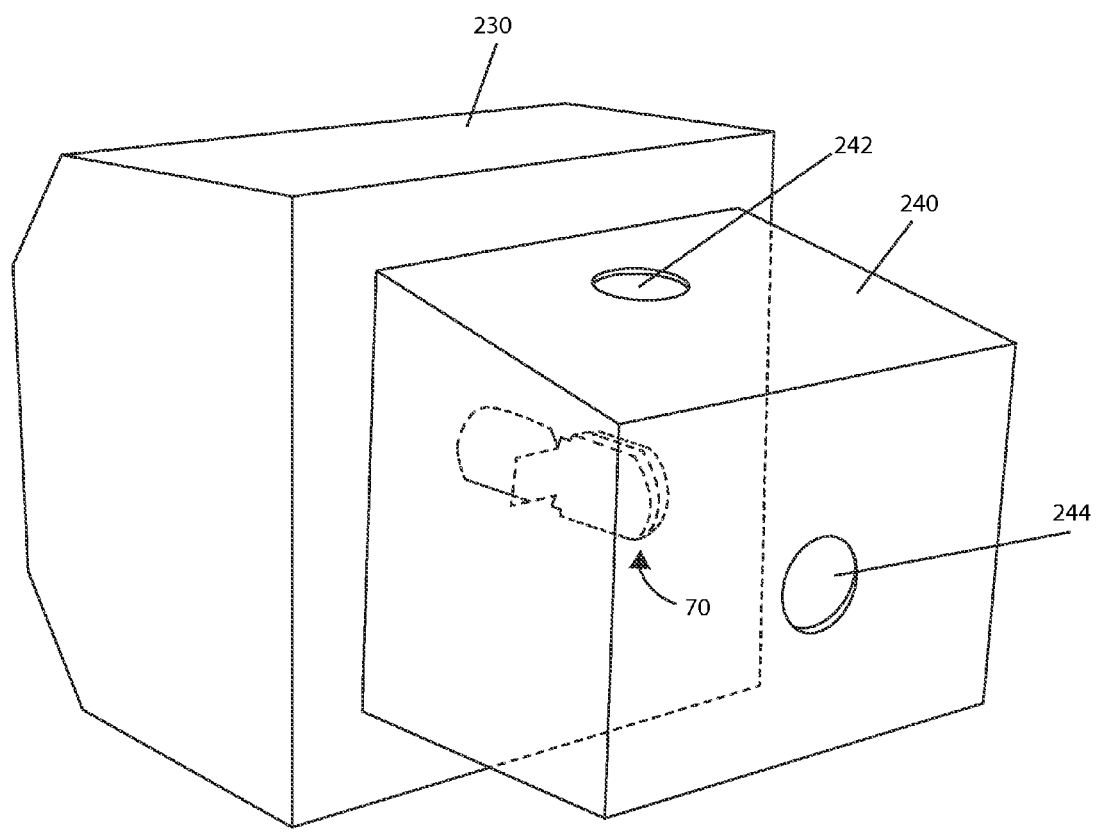

A first component 230 and second component 240 are shown interconnected in FIG. 19. Connector 70 adjoins the components 230, 240 as described above with regard to FIGS. 14-18. It can be seen that the second component 240 includes additional apertures 242, 244 which may be used for connecting the second components to additional components using additional connectors.

The figures of various embodiments, including the components and/or connectors, may be made a planar substrate in the form of a sheet such paper, which may be a stiff paper such as a board stock, plastic, which may be a thin and foldable plastic, or other suitable material. The sheets may be folded into their final configurations and assembled together using only the sheets themselves and without the use of adhesive or other materials to secure them together.

In the foregoing description, the inventions have been described with reference to specific embodiments. However, it may be understood that various modifications and changes may be made without departing from the scope of the inventions.

The invention claimed is:

1. A system for assembling a figure by folding a plurality of sheets comprising:
   a first component comprising a face, and an aperture within the face;
   a second component comprising a face, and an aperture within the face;

a connector comprising a plurality of panels, each panel comprising an elongated sheet having a first end portion, a second end portion, and a central portion, wherein the central portion is narrower than the first and second end portions, wherein the panels are connected to each other in a side-by-side orientation or end-on-end orientation and are configured to be folded between at least two adjacent panels into a zigzag configuration;

wherein the connector is configured to fit within the apertures of the first and second components to securely adjoin the first component to the second component such that the first and second component are rotatable relative to each other.

2. The system of claim 1 wherein the plurality of panels comprises a first panel and a second panel, wherein the first end portion of the first panel is adjoined to the first end portion of the second panel along a first fold line, and wherein the second end portion of the first panel is adjoined to the second end portion of the second panel along a second fold line, and wherein there is an aperture between the central portion of the first panel and the central portion of the second panel.

3. The system of claim 1 wherein the connector has an edge which tapers into a recess on one side of the central portion of the connector.

4. The system of claim 3 wherein the connector has an edge which tapers into a recess on both sides of the central portion of the connector.

5. The system of claim 4 wherein the edge of the connector further forms a ledge, adjacent to the recesses, on both sides of the central portion of the connector.

6. The system of claim 1 wherein the aperture of the first component is configured to provide a rotating connection to the connector and wherein the aperture of the second component is configured to provide a non-rotating connection to the connector.

7. The system of claim 1 wherein the figure is a human, humanoid, or animal and wherein the first component comprises a limb or a head when folded and the second component comprises a torso when folded.

8. The system of claim 1 wherein the first component further comprises a tab and a slot wherein the slot is configured to receive the tab to hold the first component in a folded configuration.

9. The system of claim 1 wherein the first component, the second component and the connector are all portions of a single sheet of a paper material and are outlined by perforated cut lines and/or an edge of the sheet to allow for separation from the sheet.

10. The system of claim 1 further comprising instructional words and/or symbols on one or more elements of the system and directing a user in how to fold the first component into the three dimensional shape, wherein the instructional words and/or symbols are positioned to be unseen after the system is assembled into the figure.

11. The system of claim 1 further comprising instructional words and or symbols on one or more elements of the system and directing a user in how to connect the first component to the second component using the connector, wherein the instructional words and/or symbols are positioned to be unseen after the system is assembled into the figure.

12. The system of claim 1 wherein the first component comprises a sheet configured to be folded into a three dimensional shape having a plurality of sides wherein one of the sides is the face of the first component and wherein the sides and face of the sheet of the first component completely surround an empty space within the component when folded into the three dimensional shape;

wherein the second component comprises a sheet configured to be folded into a three dimensional shape having a plurality of sides wherein one of the sides is the face of the second component; and wherein the connector is further configured to adjoin the first component to the second component with the face of the first component abutting the face of the second component.

13. A method of creating a figure from a plurality of components comprising:

folding a first sheet into a three dimensional shape comprising the first component, wherein the three dimension shape comprises a plurality of sides, a face, and an aperture located within the face;

folding a second sheet into a three dimensional shape comprising the second component, wherein the three dimensional shape comprises a plurality of sides, a face, and an aperture located within the face of the second component;

inserting a first end portion of a connector into the aperture of the first component, wherein the connector comprises one or more panels, wherein each panel comprises an elongated sheet having a first end portion, a second end portion, and a central portion, wherein the central portion is narrower than the first and second end portions; and inserting the second end portion of the connector into the aperture of the second component.

14. The method of claim 13 wherein the figure comprises a human, humanoid, or animal, wherein the first component comprises a head or limb of the human or animal, and wherein the second component comprises a torso of the human or animal, wherein the first component, the second component, and the connector are comprised of a paper material, and wherein, after inserting the first and second end portions, the connector securely holds the face of the first component adjacent to and abutting the face of the second component but allows for rotation of the first component relative to the second component.

15. The method of claim 13 wherein the connector comprises a plurality of panels oriented side by side or end-on-end, further comprising folding the connector between the panels.

16. The method of claim 12 wherein the aperture of the first component is configured to provide a rotating connection to the connector and wherein the aperture of the second component is configured to provide a non-rotating connection to the connector.

17. A figure comprising:

a first component comprising a face of a first planar substrate folded into a three dimensional shape and an aperture within the face;

a second component comprising a face of a second planar substrate folded into a three dimensional shape and an aperture within the face; and a connector comprising two or more panels, each panel comprising an elongated sheet having a first end portion, a second end portion, and a central portion, wherein the panels are connected to each other in a side-by-side orientation or an end-on-end orientation and are folded between the two or more panels;

wherein the central portion of each panel is narrower than the first and second end portions;

wherein the edges of each panel taper inward to form a recess on each side of the panel; and wherein the connector connects the first component to the second component through the apertures and allows rotation of the first component relative to the second component.

18. The figure of claim 17 wherein the aperture of the first component provides a rotating connection between the first component and the connector and wherein the aperture of the second component provides a non-rotating connection between the second component and the connector.

19. The figure of claim 17 wherein the edges of each panel further form a ledge, adjacent to the recess, on each side of the central portion.

20. The figure of claim 18 wherein the first component, the second component, and the connector are comprised of a paper material.

* * * * *